Feb. 1, 1949.    H. C. GILLETTE    2,460,689
BORING HEAD
Filed April 11, 1945                              2 Sheets-Sheet 1
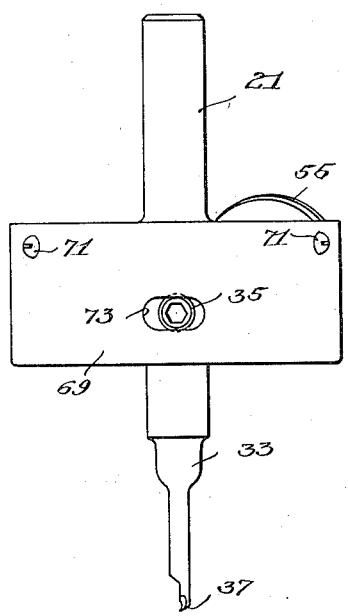
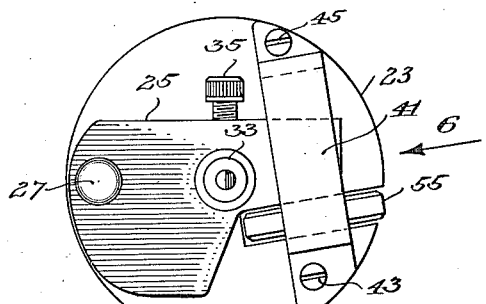
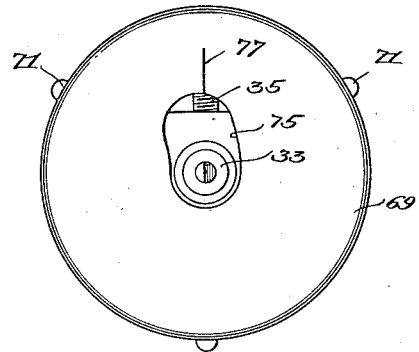
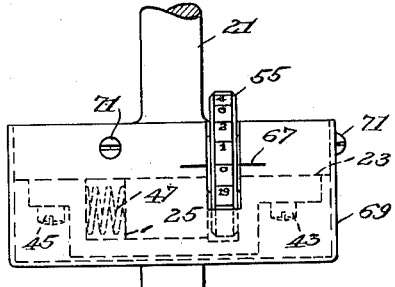
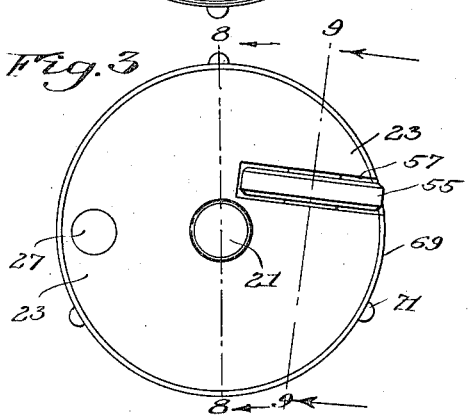
INVENTOR.
Howard C. Gillette
BY Charles Shepard
his Attorney Feb. 1, 1949.　　　　　H. C. GILLETTE　　　　　2,460,689
BORING HEAD
Filed April 11, 1945　　　　　　　　　　　　　　2 Sheets-Sheet 2
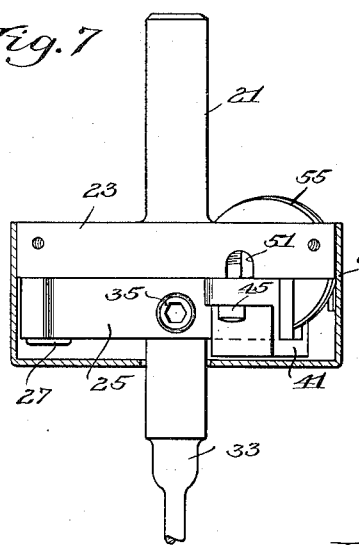
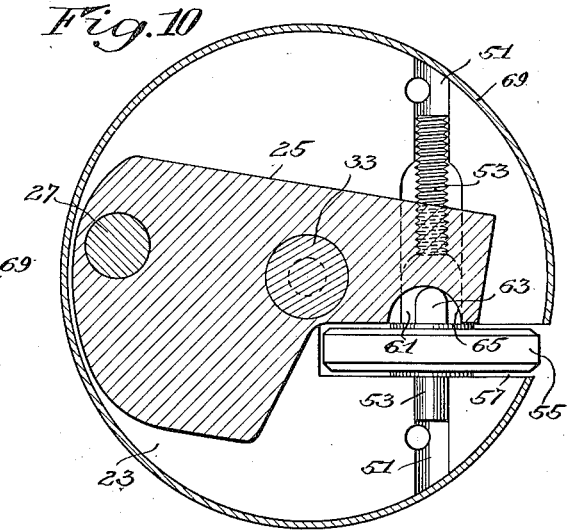
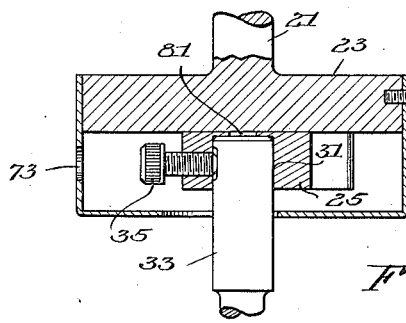
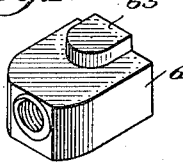
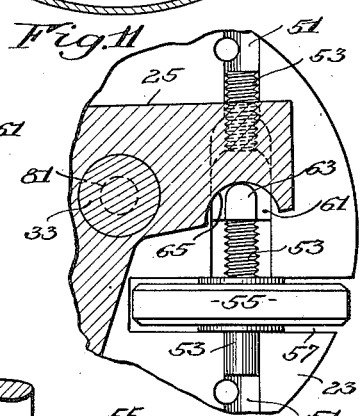
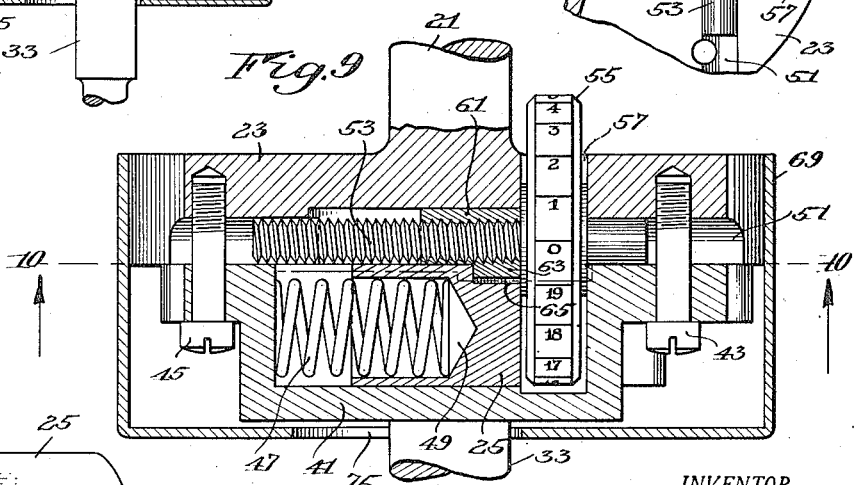
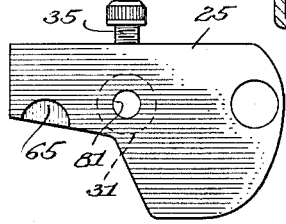
INVENTOR.
Howard C. Gillette
BY Charles Shepard,
his Attorney Patented Feb. 1, 1949

2,460,689

UNITED STATES PATENT OFFICE 2,460,689

BORING HEAD

Howard C. Gillette, Gates, N. Y.

Application April 11, 1945, Serial No. 587,709

7 Claims. (Cl. 279—6)

This invention relates to a boring head, and has for one of its objects the provision of a generally improved and more satisfactory boring head.

Another object is the provision of a boring head of simple and sturdy construction, easy and inexpensive to manufacture, but having great sturdiness and accuracy in use.

Still another object is the provision of a boring head of light and compact form, but with sufficient strength and rigidity so that it may be used for boring of great accuracy.

A further object is the provision of a boring head so designed and constructed that it may be used for boring operations performed either on a boring machine, milling machine, or lathe, or on other machine tools.

These and other desirable objects are accomplished by the construction disclosed as an illustrative embodiment of the invention in the following description and in the accompanying drawings forming a part hereof, in which:

Fig. 1 is a side elevation of a boring head in accordance with a preferred embodiment of the invention;

Fig. 2 is a bottom plan view thereof;

Fig. 3 is a top plan view thereof;

Fig. 4 is a bottom plan view with the cover or casing removed, showing the adjustable parts in one position of adjustment;

Fig. 5 is a view similar to Fig. 4 showing the parts in a different position of adjustment;

Fig. 6 is a side elevation viewed from the direction of the arrow 6 in Fig. 4;

Fig. 7 is a side elevation similar to Fig. 1 but with the casing in section so as to show an elevational view of the parts inside the casing;

Fig. 8 is a vertical section taken substantially on the line 8—8 of Fig. 3;

Fig. 9 is a vertical section on a larger scale, taken substantially on the line 9—9 of Fig. 3;

Fig. 10 is a horizontal section taken substantially on the line 10—10 of Fig. 9;

Fig. 11 is a view similar to a fragment of Fig. 10 showing the parts in a different position of adjustment;

Fig. 12 is a view of the boring tool carrier removed from the rest of the boring head; and Fig. 13 is a perspective view of the adjusting nut which positions the boring tool carrier.

The same reference numerals throughout the several views indicate the same parts.

In performing boring operations with a boring tool (as distinguished from drilling operations performed with a twist drill, for example) the boring tool and the work are rotated relatively to each other about an axis of rotation, and the boring tool is of smaller size than the diameter of the hole to be bored, the diameter of the hole being dependent upon the extent to which the cutting edge of the tool is offset eccentrically from the axis of rotation. In certain types of machine tools, such as an ordinary engine lathe, it is usually the work or stock which is rotated, while the boring tool remains stationary except for its feeding movement. In other types of machine tools, such as a vertical spindle milling machine, it is usually the work or stock which remains stationary, while the boring tool is rotated as well as partaking of a longitudinal feeding movement. The boring head of the present invention may be used with either of these types of machine tools although its main usefulness and primary advantage is in connection with a vertical spindle milling machine or other machine of a similar character.

The boring head comprises, in general, a shank for mounting on the rotary spindle of the milling machine (or on some suitable part of a lathe, such as the tool post or the tail stock) and a holder or carrier for holding the boring tool, and mechanism for adjusting the position of the holder or carrier so as to vary the eccentricity of the cutting edge of the boring tool with respect to the axis of the shank. Other arrangements of the same general character have heretofore been proposed, but it is believed that the present arrangement here disclosed represents a substantial improvement over the prior constructions.

According to the present invention there is provided a shank 21 for mounting, for example, on the spindle of a vertical milling machine. This shank carries a plate 23, conveniently of circular outline when viewed in plan as in Fig. 3, and preferably formed integrally with the shank 21. Mounted on the lower face of this plate 23 is the boring tool holder or carrier 25 of the irregular shape shown in Figs. 4, 5, 10, and 12, which holder is pivoted near one end on the pivot pin 27 fixed to the plate 23 near one edge thereof. Near its middle, the carrier 25 is provided with a socket 31 in which the shank of the boring tool 33 may be mounted, to be removably yet firmly held therein by the set screw 35. The boring tool has a cutting edge 37 of any convenient form or shape.

The end of the holder or carrier 25 which is remote from the pivot 27 is somewhat narrowed as seen in the drawings, and is received in a snug sliding fit between the lower side of the plate 23, on the one hand, and a stirrup member 41 on the other hand, which stirrup member is secured as by screws 43 and 45 (Fig. 9) to the lower surface of the main plate 23. This stirrup member provides a guide for the top and bottom surfaces of the carrier 25, holding it snugly against vertical movement, but permits the carrier 25 to swing to a limited extent about its pivot 27. A coiled spring 47, one end of which is seated in a cavity or bore 49 in the carrier 25, presses leftwardly (when viewed as in Fig. 9) against one end of the stirrup 41, and presses rightwardly against the carrier 25, constantly tending to swing the carrier in a counterclockwise direction (when viewed from above) about its pivot 27.

The bottom surface of the plate 23 is provided, approximately in line with the stirrup 41, with a channel or slot 51 in which is mounted a lead screw 53 having fixed thereto a graduated head or disk 55 extending out through a slot 57 to an accessible position at the top and front of the plate 23. Longitudinal movement of the lead screw 53 in the channel 51 is prevented by the snug rotary fit of a thickened portion of the disk 55 in the slot 57. Consequently, when the disk 55 is rotated in one direction or the other, this causes longitudinal travel along the led screw of a nut 61 mounted on the screw, which nut is of the shape shown in Fig. 13, having a downwardly projecting lug 63 with a rounded end engaging in a rounded recess 65 in the carrier 25. When the disk 55 is rotated in one direction, the nut 61 travels along the screw 53 in a leftward direction when viewed as in Fig. 9, and the lug 63 on this nut, engaging in the recess 65 on the carrier 25, swings the end of the carrier in a leftward direction against the force of the spring 47, thus swinging the carrier in a clockwise direction (when viewed from above) about its pivot 27. When the disk 55 is rotated in the opposite direction, the nut 61 travels rightwardly on the lead screw 53, and thus releases the pressure on the carrier 25 so that the spring 47 may return the carrier in a rightward or counterclockwise direction, the spring always keeping the carrier in tight engagement with the lug 63 on the nut 61. Preferably the disk 55 is graduated with suitable graduations, as indicated in the drawings, reading directly in thousandths of an inch or other suitable units of measurement, which are read in connection with a zero line or index mark 67 (Fig. 6) on the exterior of a cup-shaped casing or housing 69 which encloses the moving parts and which is removably secured to the main plate 23 as by screws 71. This housing 69 has an opening 73 (Fig. 1) in line with the set screw 35, so that the set screw may be readily reached by a wrench, and it also has an arcuate opening 75 (Fig. 2) in its bottom, to allow ample room for passage of the boring tool 33 in any position to which the carrier 25 may be swung.

When the carrier 25 is substantially at one extreme limit of its travel (that is, the extreme counterclockwise limit, when viewed from above) the socket 31 for holding the boring tool 33 is alined with the axis of the shank 21. To enable the machinist to see when exact alinement exists, for purposes of calibration, the bottom of the socket 31 is provided with a small opening 81 (Fig. 8) extending entirely through the thickness of the carrier 25, and the lower face of the plate 23 is provided with a punch prick or other suitable mark directly in line with the axis of the shank 21. The machinist may sight through the socket 31 and opening 81 (the cutting tool being removed from the socket, of course) and when he sees the punch prick centered in the small hole 81, he knows that the socket 31 for the cutting tool is accurately alined with the axis of the shank 21.

To aid in setting the cutting tool properly in the socket, the bottom of the housing 69 carries an index mark 77. The cutting tool should be so set in the socket 31 (when this socket is alined with the shank 21, as indicated by the visibility of the punch mark through the hole 81) that the bottom edge of the cutting tool points directly toward the line or mark 77, as indicated in Fig. 2. This line 77 constitutes a fragment of an imaginary radius drawn from the axis of the shank 21, perpendicular to a radius drawn from this axis through the pivot 27. When the lower edge of the cutting tool points toward the mark 77, it follows that this lower edge of the tool is perpendicular to a radius drawn from the tool to the pivot 27, and thus is as it should be to obtain proper engagement of the cutting edge of the tool with the work to be cut, in any position to which the carrier 25 may be swung.

In use, the boring tool 33 is fixed in the socket 31, and the shank 21 is clamped firmly in the chuck of the rotating spindle of a vertical milling machine or the like, so that the longitudinal axis of the shank 21 becomes the axis of rotation of the entire boring head. The diameter of the hole to be bored by the cutting tool 33 may then be adjusted by suitable manipulation of the graduated wheel 55. When the wheel 55 is turned to swing the carrier 25 farther in a clockwise direction when viewed from above, this offsets the cutting tool 33 farther from the longitudinal axis of the shank 21, thus increasing the eccentricity of the cutting tool with respect to the rotary axis of the work, resulting in the boring of a larger diameter hole. By turning the adjusting wheel 55 in the opposite direction, the cutting tool will be brought closer to the rotary axis and thus a hole of smaller diameter will be bored. Normally the direction of rotation of the boring head is a clockwise rotation when viewed from above, and the clockwise rotation of the plate 23 drives the carrier 25 in a positive manner, through the nut 61. The driving force does not pass through the spring 47, which merely keeps the carrier constantly engaged with the nut. Moreover, the reaction force of the work against the cutting tool is very largely in a direction to be resisted by the pivot 27, with usually only a minor component of force toward the nut, so that this nut does not have to bear the full brunt of the cutting force, but only a fraction thereof.

It will be observed that the construction above disclosed is made of few parts, easily machined and constructed, so that the appliance may be made relatively inexpensively. Yet it is of sturdy and rigid design, standing up well under long continued and rough usage, and enabling the accomplishment of boring operations of great accuracy.

It is seen from the foregoing disclosure that a construction is provided which admirably fulfills the above-mentioned objects of the invention. It is to be understood that the foregoing disclosure is given by way of illustrative example only, rather than by way of limitation, and that without departing from the invention, the construction may be varied within the scope of the appended claims.

What is claimed is:

1. A boring head for use with a machine tool, including a member for attachment to the machine tool, a carrier pivotally mounted on said member for oscillation with respect thereto, said carrier extending in a generally radial direction from its pivotal connection with said member, a socket on said carrier intermediate its ends for holding a boring tool, a stirrup secured to said member for embracing the end of said carrier remote from said pivotal connection to confine said carrier against movement in a direction away from said member while allowing it to swing in a direction parallel to said member, adjusting screw means thrusting against said carrier in one direction at a point remote from said pivotal connection, and a spring thrusting against said carrier in the opposite direction.

2. A boring head for use with a machine tool, including a shank for attachment to the machine tool, a plate attached to said shank, said plate being of disk-like form and having an approximately circular outline substantially concentric with said shank, a pivot mounted on said plate adjacent one edge thereof, a carrier mounted on said pivot to oscillate thereon and extending in an approximately diametrical direction from said pivot across said plate, a socket at an intermediate point of said carrier for receiving a boring tool, and means mounted on said plate and cooperating with said carrier near the end thereof remote from said pivot, for adjusting the position of said carrier relatively to said plate to adjust the eccentricity of a boring tool mounted on said carrier with respect to the axis of said shank.

3. A construction as described in claim 2, further including a stirrup member mounted on said plate near the opposite side thereof from said pivot, said stirrup member including two spaced portions secured to said plate and an intermediate portion forming a guide for said carrier near the end thereof remote from said pivot, to confine said carrier against movement away from said plate while permitting it to oscillate in a plane parallel to said plate.

4. A construction as described in claim 2, in which said means for adjusting the position of said carrier includes a screw mounted on said plate for rotation with respect thereto and held against longitudinal movement with respect thereto, and a nut mounted on said screw and bearing against said carrier to determine the position of said carrier.

5. A boring head for use with a machine tool, including a disk-like plate and a shank formed integrally therewith and extending perpendicularly thereto, a pivot projecting from the face of said plate remote from said shank, said pivot being near one lateral edge of said plate, a carrier mounted on said pivot for oscillating movement across a portion of the face of said plate remote from said shank, a longitudinal groove in said plate and a transverse slot intersecting said groove, a screw mounted for rotation in said groove and having a graduated head mounted in said transverse slot and being held thereby against longitudinal movement, a nut mounted on said screw to travel thereon when said graduated head and said screw are turned, said nut having a portion bearing against said carrier at a point offset from said pivot to determine the position of said carrier, and means on said carrier for holding a boring tool so that said boring tool will be moved with respect to the axis of said shank when said carrier is oscillated to a different position.

6. A boring head for use with a machine tool, said head including a disk-like plate having a substantially flat and approximately circular forward face and having a rear face and a mounting shank projecting rearwardly from said rear face, the axis of said shank being substantially perpendicular to and concentric with said forward face of said plate, a carrier lying against said forward face of said plate and extending across said forward face in approximately diametrical relation thereto, said carrier being pivotally connected near one end thereof to said plate near one edge thereof so that said carrier may oscillate on the face of said plate, a channel formed in said plate near an edge thereof opposite to the pivotal connection of said carrier to said plate, an adjusting screw mounted in said channel and operatively connected to said carrier to adjust the position of said carrier relative to said plate, and a socket on said carrier intermediate the ends thereof for holding a cutting tool.

7. A boring head for use with a machine tool, said head including a disk-like plate having a substantially flat and approximately circular forward face and having a rear face and a mounting shank projecting rearwardly from said rear face, the axis of said shank being substantially perpendicular to and concentric with said forward face of said plate, a carrier lying against said forward face of said plate and extending across said forward face in approximately diametrical relation thereto, said carrier being pivotally connected near one end thereof to said plate near one edge therof so that said carrier may oscillate on the face of said plate, a first channel formed in said plate near an edge thereof opposite to the pivotal connection of said carrier to said plate, an adjusting screw mounted in said channel and operatively connected to said carrier to adjust the position of said carrier relative to said plate, a socket on said carrier intermediate the ends thereof for holding a cutting tool, a second channel formed in said plate in a position intersecting said first channel and said adjusting screw, and a screw-operating member attached to said adjusting screw and lying partly in said second channel and projecting out of said second channel to an accessible position for manipulation.

HOWARD C. GILLETTE.

REFERENCES CITED

The following references are of record in the file of this patent:

UNITED STATES PATENTS

| Number | Name | Date |
|---|---|---|
| 971,120 | Day | Sept. 27, 1910 |
| 984,000 | Hull | Feb. 14, 1911 |
| 1,825,060 | Hallenbeck | Sept. 29, 1931 |
| 2,376,594 | Hite | May 22, 1945 |